(12) United States Patent
Pillay et al.

(10) Patent No.: US 7,538,824 B1
(45) Date of Patent: May 26, 2009

(54) SYSTEMS AND METHODS FOR REDUCING NOISE DURING VIDEO DEINTERLACING

(75) Inventors: Sanjay R. Pillay, Austin, TX (US); Brian F. Bounds, Dripping Springs, TX (US); William Lynn Gallagher, Austin, TX (US)

(73) Assignee: Magnum Semiconductor, Inc., Fremont, CA (US)

( * ) Notice: Subject to any disclaimer, the term of this patent is extended or adjusted under 35 U.S.C. 154(b) by 587 days.

(21) Appl. No.: 11/206,402

(22) Filed: Aug. 18, 2005

(51) Int. Cl.
*H04N 5/14* (2006.01)
*H04N 5/21* (2006.01)
*H04N 17/00* (2006.01)

(52) U.S. Cl. .................. 348/701; 348/452; 348/607

(58) Field of Classification Search .................. 348/448, 348/452, 607, 700, 701; 382/275
See application file for complete search history.

(56) References Cited

U.S. PATENT DOCUMENTS

| | | | | |
|---|---|---|---|---|
| 5,027,201 | A * | 6/1991 | Bernard | 348/702 |
| 5,339,109 | A | 8/1994 | Hong | |
| 5,467,439 | A | 11/1995 | Lee et al. | |
| 5,519,451 | A | 5/1996 | Clatanoff et al. | |
| 5,519,452 | A * | 5/1996 | Parulski | 348/620 |
| 5,532,751 | A | 7/1996 | Lui | |
| 5,602,654 | A | 2/1997 | Patti et al. | |
| 5,625,421 | A * | 4/1997 | Faroudja et al. | 348/607 |
| 5,708,474 | A | 1/1998 | Hong | |
| 5,832,143 | A | 11/1998 | Suga | |
| 5,995,154 | A * | 11/1999 | Heimburger | 348/448 |
| 6,005,971 | A * | 12/1999 | Bergman et al. | 382/165 |
| 6,061,100 | A * | 5/2000 | Ward et al. | 348/607 |
| 6,118,489 | A * | 9/2000 | Han et al. | 348/452 |
| 6,122,017 | A * | 9/2000 | Taubman | 348/620 |
| 6,133,957 | A | 10/2000 | Campbell | |
| 6,181,382 | B1 * | 1/2001 | Kieu et al. | 348/459 |
| 6,295,091 | B1 | 9/2001 | Huang et al. | |
| 6,340,990 | B1 * | 1/2002 | Wilson | 348/448 |
| 6,400,762 | B2 | 6/2002 | Takeshima | |
| 6,421,090 | B1 * | 7/2002 | Jiang et al. | 348/452 |
| 6,577,435 | B1 | 6/2003 | Bang et al. | |
| 6,614,484 | B1 | 9/2003 | Lim et al. | |
| 6,757,022 | B2 | 6/2004 | Wredenhagen | |
| 6,795,123 | B2 | 9/2004 | Gotanda et al. | |
| 6,940,557 | B2 * | 9/2005 | Handjojo et al. | 348/452 |
| 7,170,561 | B2 * | 1/2007 | Winger et al. | 348/448 |
| 7,245,326 | B2 * | 7/2007 | Orlick | 348/448 |
| 2001/0008425 | A1 * | 7/2001 | Shin et al. | 348/452 |
| 2001/0015768 | A1 * | 8/2001 | Shin et al. | 348/452 |
| 2003/0156301 | A1 * | 8/2003 | Kempf et al. | 358/486 |
| 2004/0233326 | A1 * | 11/2004 | Yoo et al. | 348/452 |
| 2004/0246546 | A1 * | 12/2004 | Minami et al. | 358/525 |
| 2005/0162566 | A1 * | 7/2005 | Chuang et al. | 348/714 |
| 2007/0103594 | A1 * | 5/2007 | Zhu et al. | 348/607 |

* cited by examiner

*Primary Examiner*—Victor R Kostak
(74) *Attorney, Agent, or Firm*—James J. Murphy; Thompson & Knight LLP

(57) ABSTRACT

A method of deinterlacing includes generating a deinterlaced display frame including a reference field of lines of display pixels of a first parity and a generated field of lines of display pixels of a second parity. A frame motion map is generated which includes bits representing a presence of motion or an absence of motion at the display pixels of the reference and generated fields. Testing is performed for the presence of motion or the absence of motion at a selected display pixel of the reference field utilizing the frame motion map. In response to detecting a presence of motion at the selected display pixel of the referenced field, replacing a pixel value corresponding to the selected display pixel with a pixel value generated by interpolating between display pixel values corresponding to neighboring display pixels in the generated field.

18 Claims, 22 Drawing Sheets

Frame $F_{PN}$ Line Y - 1

Frame $F_{PN}$ Line Y

Frame $F_{PN}$ Line Y +1

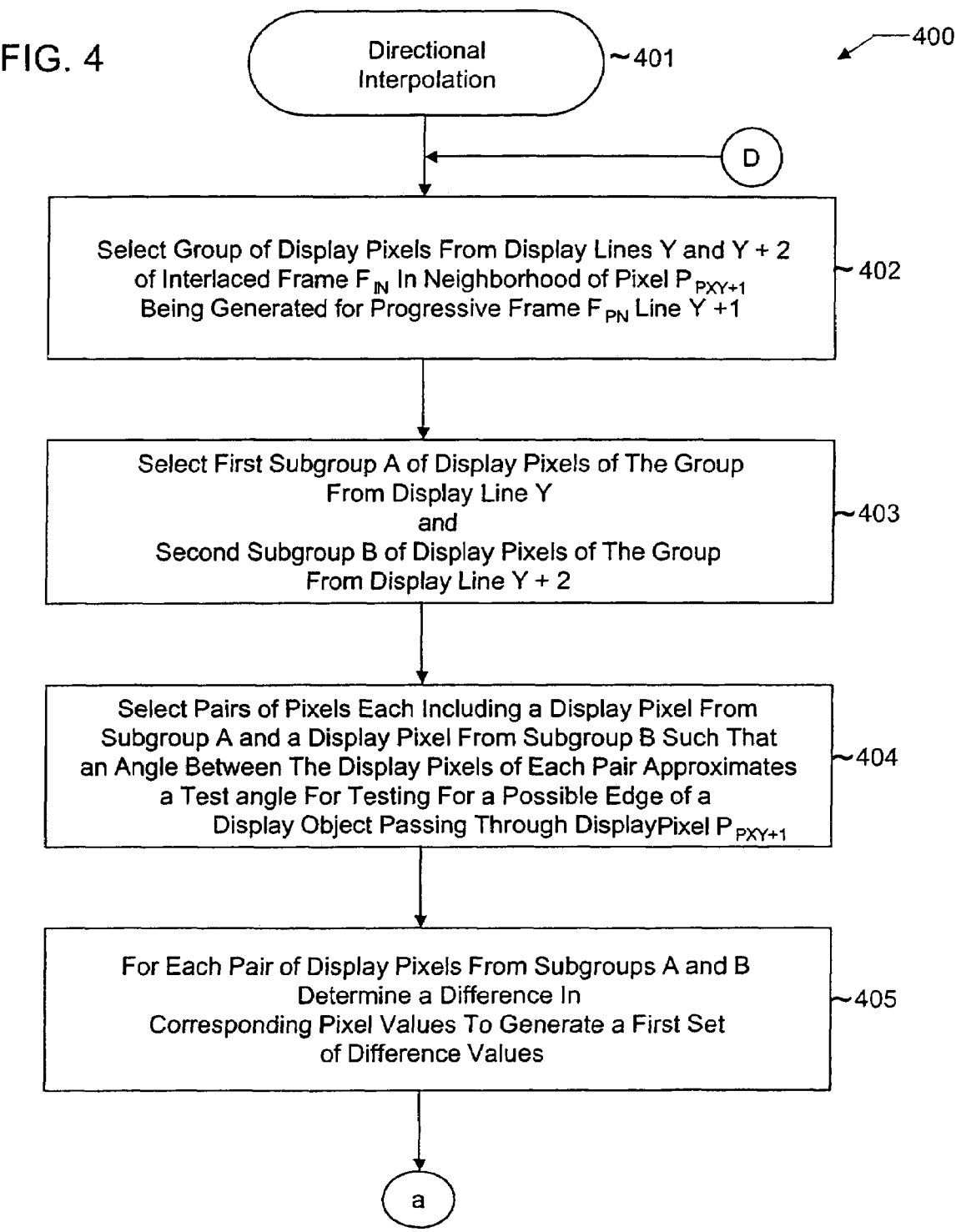

SYSTEMS AND METHODS FOR REDUCING NOISE DURING VIDEO DEINTERLACING

CROSS REFERENCE TO RELATED APPLICATION

The following co-pending and co-assigned applications contain related information and are hereby incorporated by reference:

Ser. No. 11/167,756 by Pillay, Bounds and Gallagher entitled CIRCUITS AND METHODS FOR DETECTING 2:2 ENCODED VIDEO AND SYSTEMS UTILIZING THE SAME, filed Jun. 27, 2005, now U.S. Pat. No. 7,450,184;

Ser. No. 11/167,877 by Pillay, Bounds and Gallagher entitled CIRCUITS AND METHODS FOR DEINTERLACING VIDEO DISPLAY DATA AND SYSTEMS USING THE SAME, filed Jun. 27, 2005;

Ser. No. 11/167,682 by Pillay, Bounds and Gallagher entitled SYSTEMS AND METHODS FOR DETECTING A CHANGE IN A SEQUENCE OF INTERLACED DATA FIELDS GENERATED FROM A PROGRESSIVE SCAN SOURCE, filed Jun. 27, 2005, now U.S. Pat. No. 7,420,626; and Ser. No. 11/172,323 by Gallagher, Bounds and Pillay entitled SYSTEMS AND METHODS FOR DISPLAY OBJECT EDGE DETECTION AND PIXEL DATA INTERPOLATION IN VIDEO PROCESSING SYSTEMS, filed Jun. 30, 2005, now U.S. Pat. No. 7,414,671.

FIELD OF INVENTION

The present invention relates in general to video processing techniques, and in particular, to systems and methods for reducing noise during video interlacing.

BACKGROUND OF INVENTION

Two primary video format standards are utilized worldwide to record, transmit, and display composite video data, namely, the National Television Systems Committee (NTSC) and the Phase Alternating Line (PAL) standards. Both the NTSC and PAL standards define interlaced video systems in which one frame of display pixels is partitioned into alternating interlaced fields, with each interlaced field updated at twice the update rate of the frame. Additionally, many digital versatile disk (DVD) players, DVD player-recorders, and similar video recording and playback systems, output data in an interlaced format, depending on the format utilized during recording.

On the other hand, many state of the art display systems, such as high definition television (HDTV) sets, generate displays using a progressive scan format. In the progressive scan format, video data are transmitted and displayed in frames, which are not partitioned into fields. In other words, each display frame is generated by sequentially scanning through the lines of each frame at the original interlaced field update rate.

Hence, in order to interface an interlaced video source, such as an interlaced-output DVD player, with a progressive-scan display system, such as a HDTV set, deinterlacing must be performed. Several deinterlacing techniques exist for converting interlaced video into progressive scan video; however, each has significant drawbacks. For example, in the weaving technique, the lines of the current field are merged with the lines of the previous field to weave a full frame. The resulting frames are generated at the full update rate. Weaving, however, often creates feathering, which is similar to ghosting-like un-sharpness of moving display objects. In the bob technique, each field is converted to a full frame by interpolating between the available lines of that same field to generate the missing pixel lines. The interpolated frames are then displayed at the field update rate. The bob technique, however, often misses information representing high frequency movement. Motion compensated deinterlacing systems are also available which compensate for un-sharpness due to motion, but these systems are normally difficult and expensive to implement and are therefore mostly limited to high-end applications.

Given increasing popularity of progressive scan display systems, as well as the need to maintain compatibility with systems generating interlaced display data, new deinterlacing techniques are required. These techniques should minimize the generation of display artifacts, such as feathering, while at the same time being easier and less expensive to implement than existing techniques.

SUMMARY OF INVENTION

The principles of the present invention are embodied in methods for deinterlacing video with a minimal amount of display noise. According to one particular embodiment of the present inventive principles, a deinterlacing method is disclosed which includes generating a deinterlaced display frame including a reference field of lines of display pixels of a first parity and a generated field of lines of display pixels of a second parity. A frame motion map is generated which includes bits representing a presence of motion or an absence of motion at the display pixels of the reference and generated fields. Testing is performed for the presence of motion or the absence of motion at a selected display pixel of the reference field utilizing the frame motion map. In response to detecting a presence of motion at the selected display pixel of the referenced field, replacing a pixel value corresponding to the selected display pixel with a pixel value generated by interpolating between display pixel values corresponding to neighboring display pixels in the generated field.

Embodiments of the present principles advantageous support the efficient generation of frames of progressive scan video data from fields of interlaced video data with the creation of a minimal number of artifacts. In particular, systems and methods embodying these principles discriminate between noise and actual motion on the display screen, such that only the noise is removed without adversely affecting the appearance of moving display objects. Furthermore, these systems and methods also discriminate between noise and display objects with spatial high frequency, such that spatial high frequency is not compromised.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1-5 of the drawings, in which like numbers designate like parts.

Figure 1:
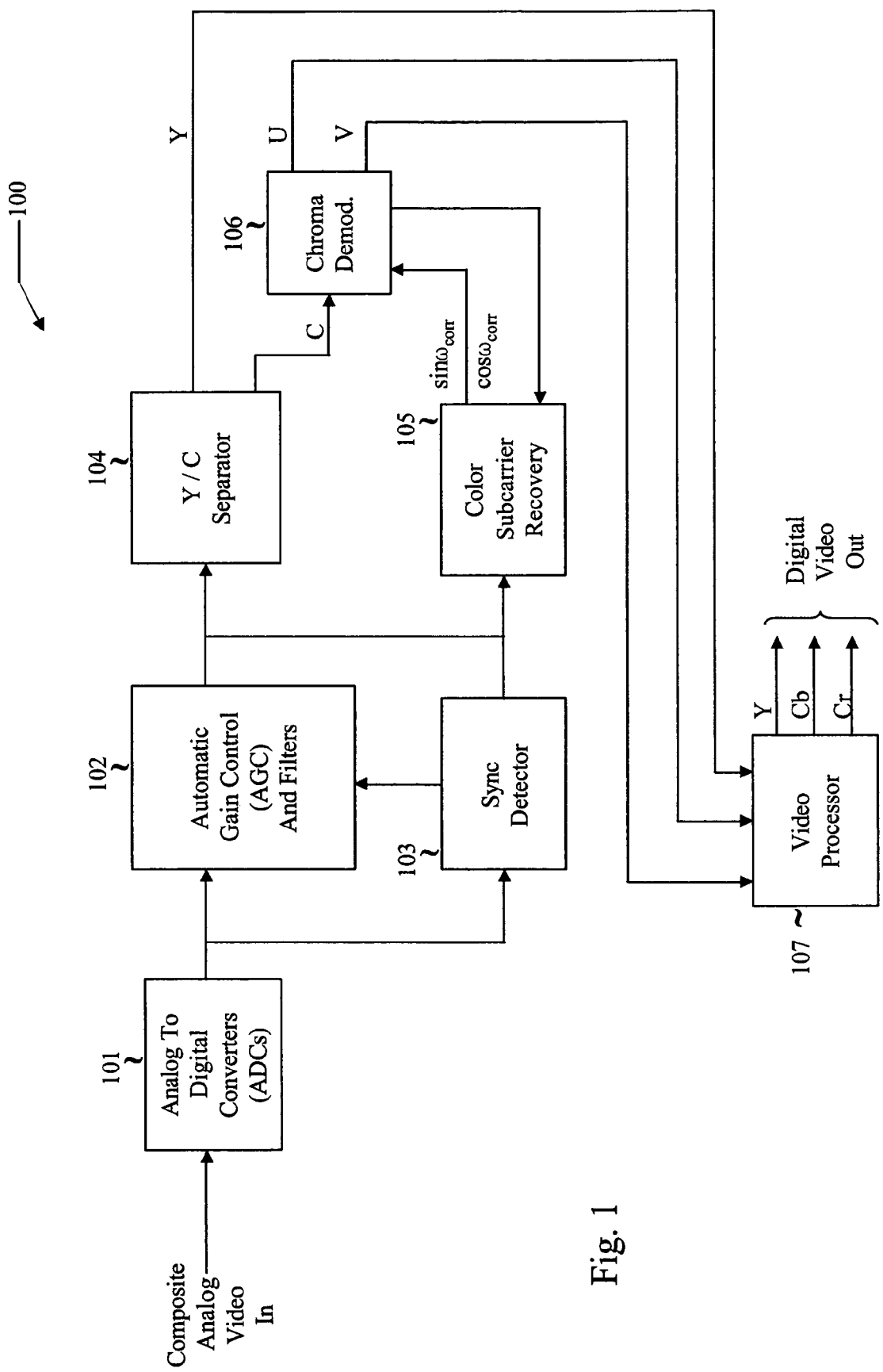
FIG. 1 is a high level block diagram of a representative audio-video system suitable for demonstrating the principles of the present invention.

FIG. 1 is a diagram of an exemplary analog to digital video decoder 100 suitable for describing the principles of the present invention. In the illustrated embodiment, video encoder converts a composite analog video input signal, in the YC format, into digital video data in the YCrCb component video format, although the inventive principles are not necessarily limited thereto.

In video encoder 100, the composite analog input video is converted into composite digital video in the YC format by analog to digital converters (ADCs) 101. The digitized YC video data are then passed through automatic gain control (AGC) and filters block 102. A sync detector 103 detects the vertical synchronization (VSYNC) signal, which controls the timing of the playback of each display field, and the horizontal synchronization signal (HSYNC), which controls the timing of the playback of each display line.

Y/C separator block 104 next separates the digital Y and C components of the digitized composite video data stream. The C component is demodulated into U and V color components by color subcarrier recovery block 105 and chroma demodulation block 106, described in further detail below. The Y, U, and V components are passed directly to video processor 107 for further processing to generate a YCrCb digital component video signal.

In the illustrated embodiment of audio-video recording and playback system 100, interlaced video to progressive scan video conversion (deinterlacing) is performed within video processor 107. In alternate embodiments, deinterlacing may be performed in a dedicated post-processor, which may be located within audio-video recording and playback system 100 or within an associated display system, such as a high definition television (HDTV).

Figure 2:
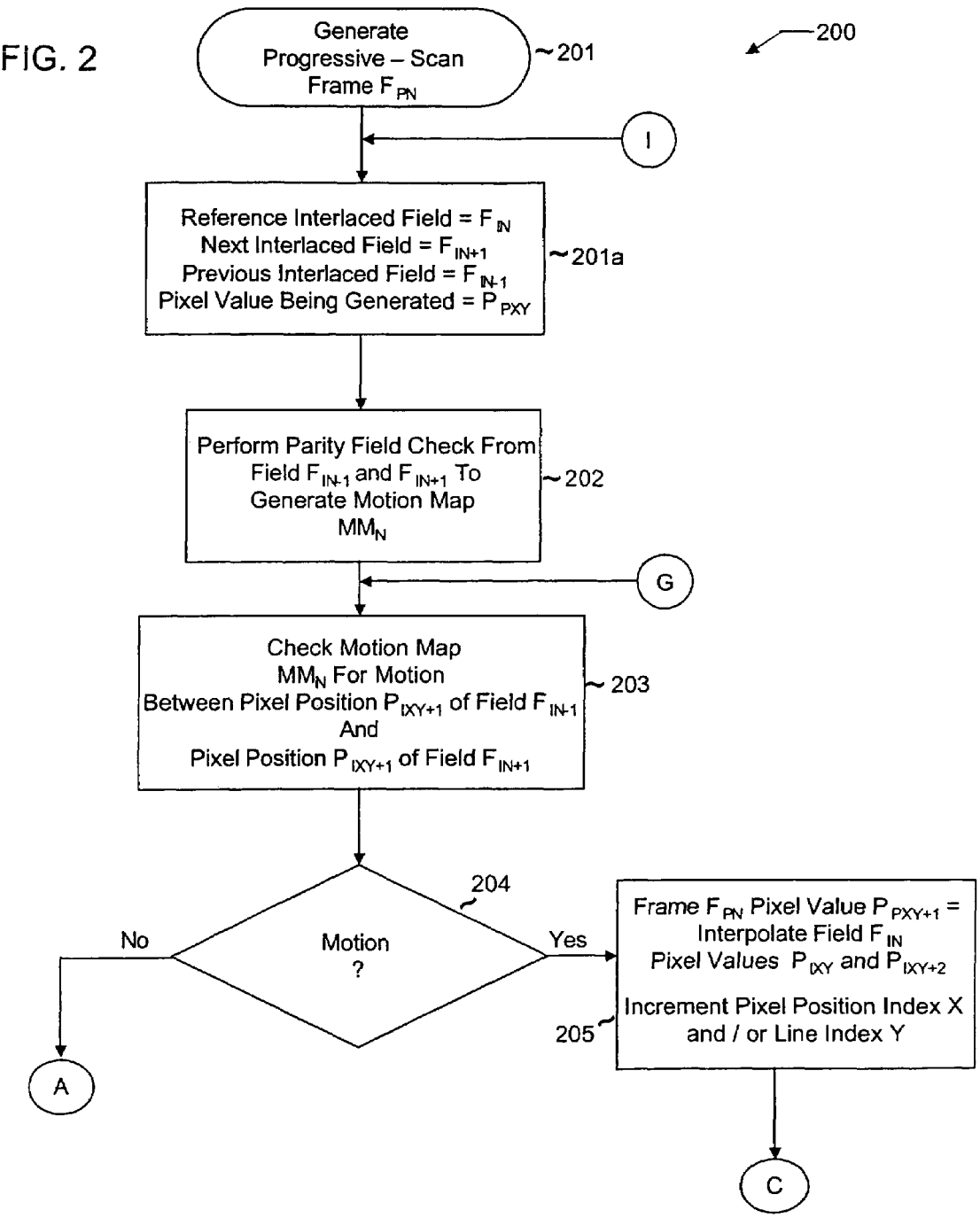
FIG. 2 is a flow chart of an exemplary deinterlacing procedure embodying the principles of the present invention.
Figure 2:
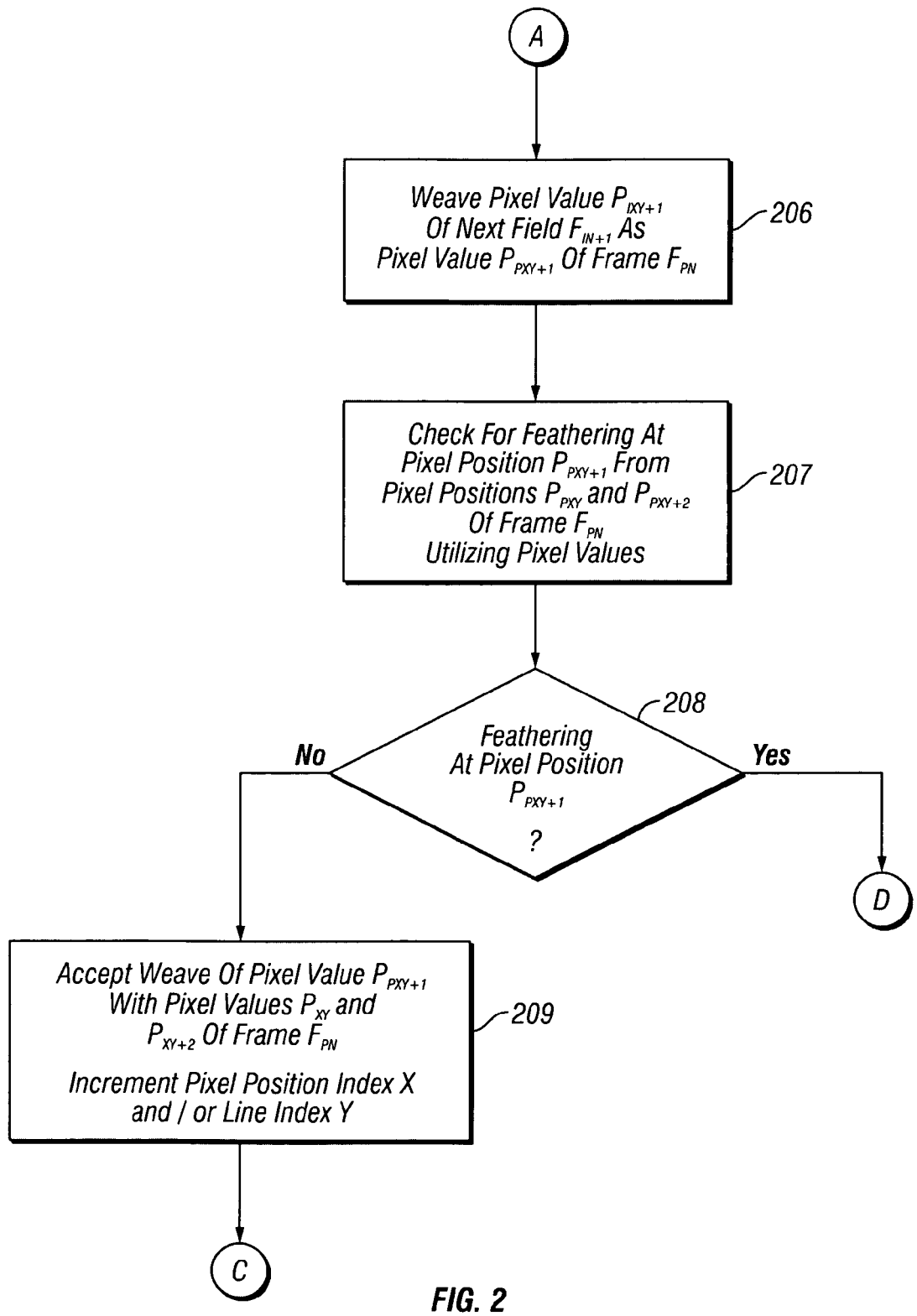
Figure 2:
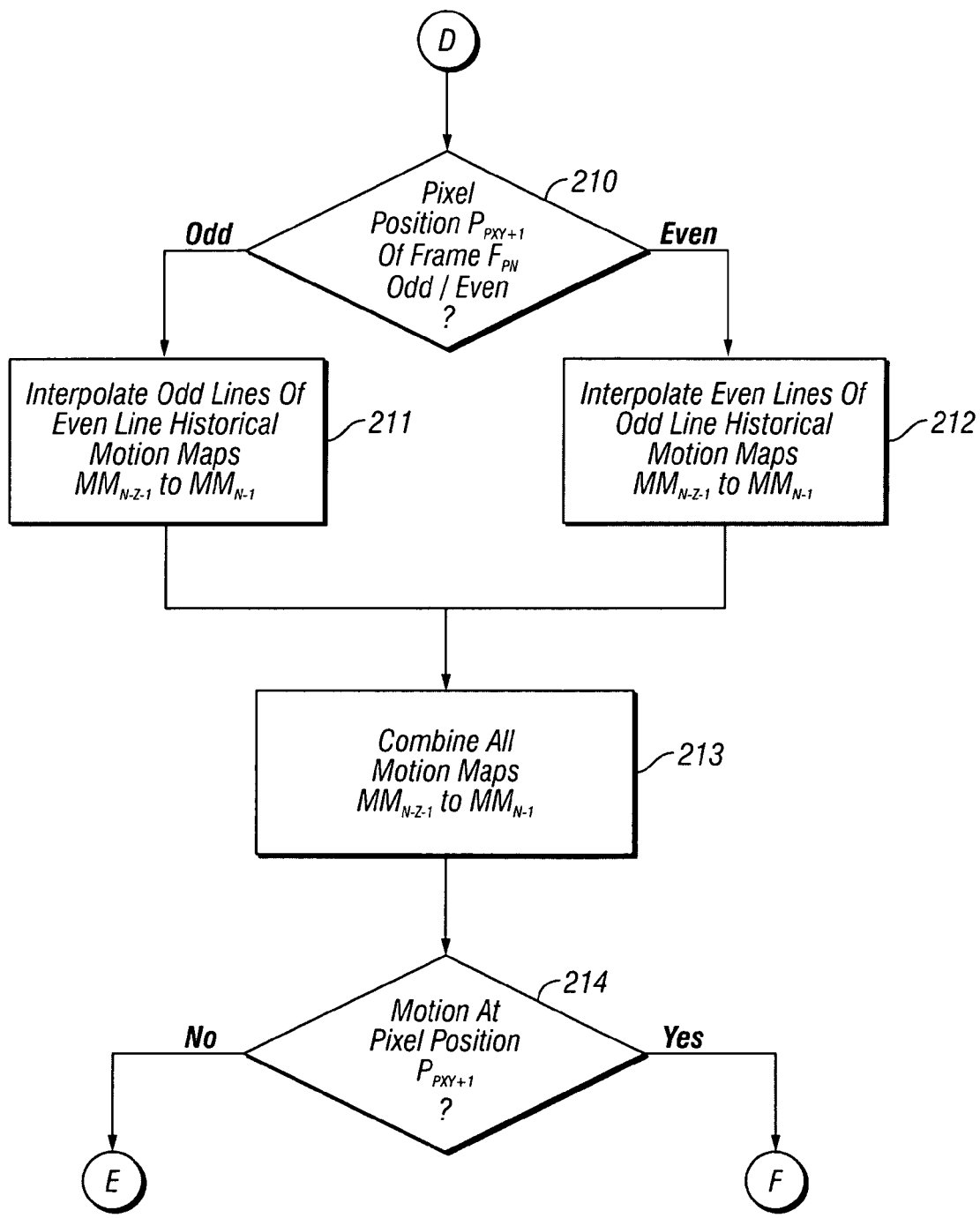
Figure 2:
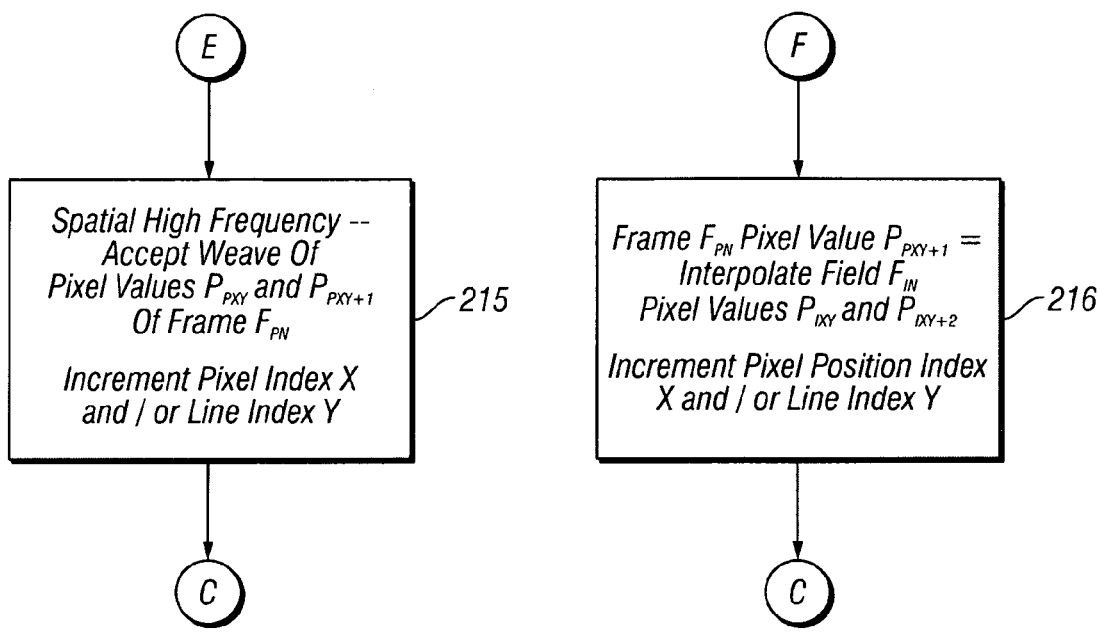
Figure 2:
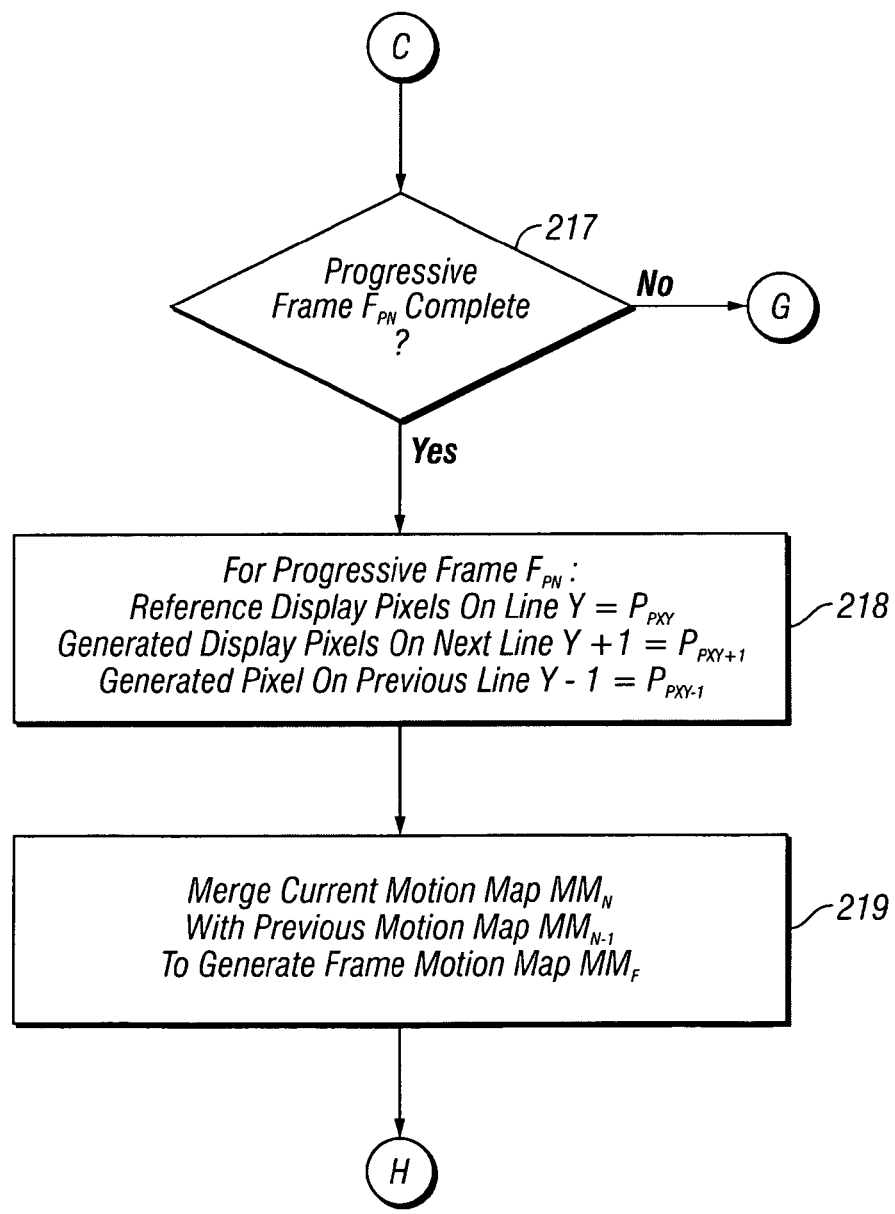
Figure 2:
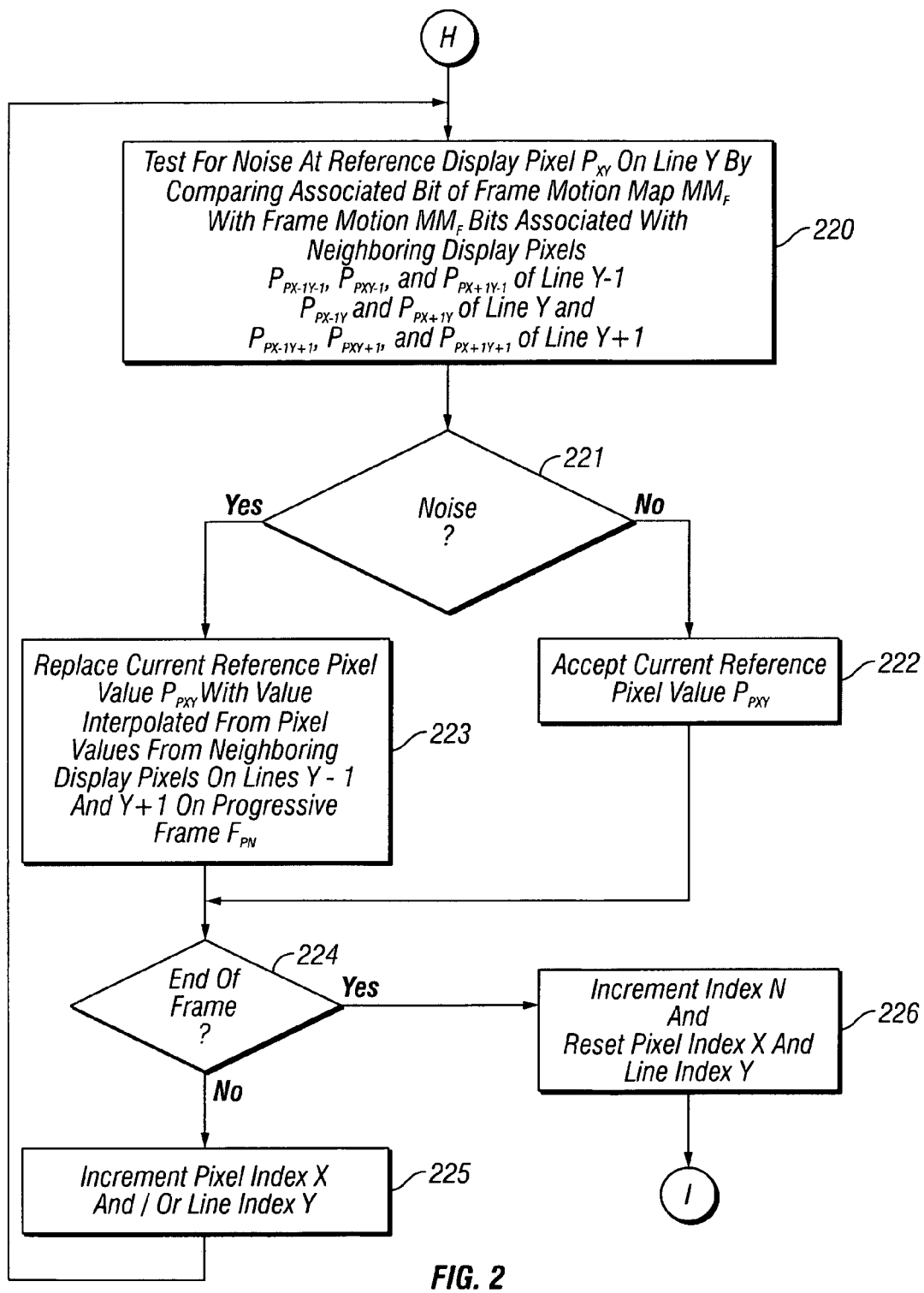

FIG. 2 is a flow chart illustrating a representative method 200 for generating a sequence of frames of progressive scan video data from a sequence of fields of interlaced video data. For discussion purposes, FIGS. 3A and 3B are respectively conceptual diagrams of small sections of interlaced and progressive scan displays.

Figure 3A:
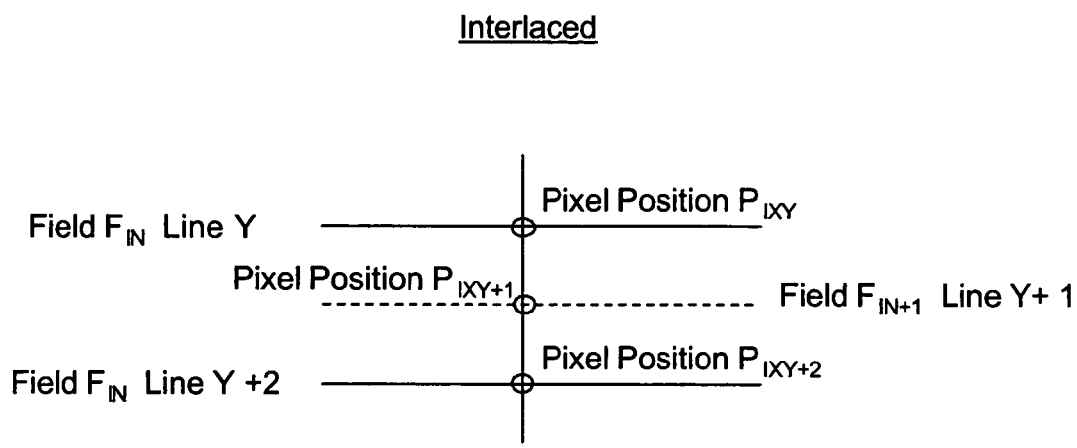
FIGS. 3A and 3B are conceptual diagrams of respective small sections of deinterlaced and progressive scan displays suitable for describing the exemplary nomenclature utilized in the flow chart of FIG. 2.
Figure 3B:
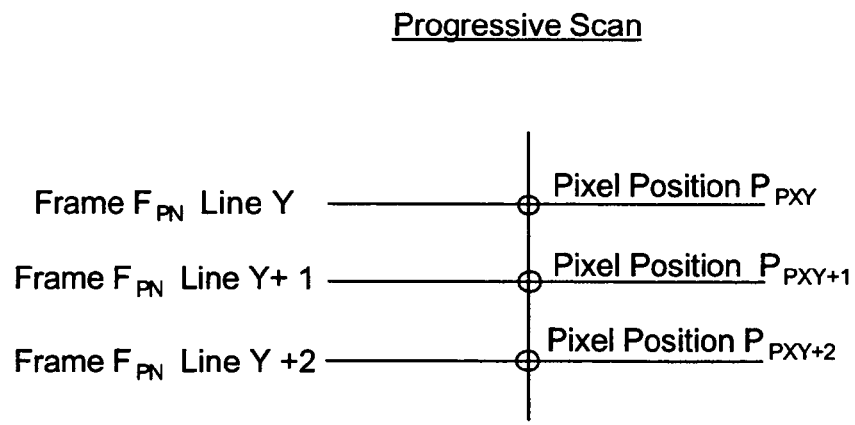
Figure 3C:
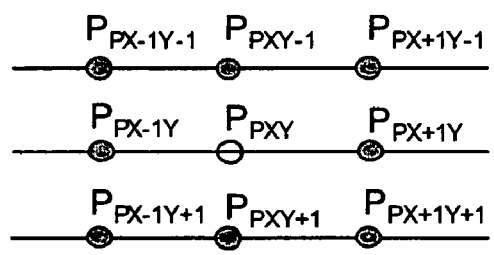
FIG. 3C illustrates a selected number of pixels in the neighborhood of a selected one of the reference display pixels discussed in conjunction with FIG. 2 and which is being filtered for noise.

In the example shown in FIGS. 2, and 3A-3B, the current interlaced field is field $F_{IN}$, in which N is an integer and may be odd or even. In particular, as shown in FIG. 3A, the current line of current field $F_{IN}$ is line Y, wherein Y is also an integer, and the spatially following line of current field $F_{IN}$ is line Y+2. The temporally following interlaced field is field $F_{IN+1}$ and provides vertically adjacent line Y+1 when fields $F_{IN}$ and $F_{IN+1}$ are interlaced in a typical interlaced display system. Representative vertically aligned interlaced pixel are pixels $P_{IXY}$ and $P_{IXY+2}$ of the current field and pixel $P_{IXY+1}$ of the temporally following field $F_{IN+1}$, in which X is an integer representing the pixel position along lines Y, Y+1, and Y+2. Display pixel positions $P_{IXY}$ and $P_{IXY+2}$ of the current field and pixel position $P_{IXY+1}$ are represented by corresponding pixel values $P_{IXY}$, $P_{IXY+2}$ and $P_{IXY+1}$, including, for example luminance and chrominance values.

As shown in FIG. 3B, each progressive scan frame is designated $F_{PN}$, in which N is an integer. In the progressive scan frame $F_{PN}$, representative vertically adjacent pixels of three lines Y, Y+1, and Y+2, are designated $P_{PY}$ and $P_{PY+1}$, and $P_{PY+2}$. Pixel positions $P_{PXY}$ and $P_{PXY+1}$, and $P_{PXY+2}$ are represented by corresponding pixel values $P_{PXY}$ and $P_{PXY+1}$, and $P_{PXY+2}$, including, for example, luminance and chrominance values.

For discussion purposes, procedure 200 will be described by assuming interlaced field $F_{IN}$ is the reference field such that pixel lines Y and Y+2 of current interlaced field $F_{IN}$ provide lines Y and Y+2 of progressive scan frame $F_{PN}$. In this example, line Y+1, of progressive scan frame $F_{PN}$, and in particular pixel $P_{PXY+1}$, is being generated during the current iteration of procedure 200.

At block 201a, the reference interlaced field is set as field $F_{IN}$, the temporally preceding interlaced field becomes field $F_{IN-1}$, and the temporally following interlaced field becomes field $F_{IN+1}$. Thus, for example if reference field $F_{IN}$ has even parity (i.e. is composed of even numbered pixel lines), then preceding field $F_{IN-1}$ and following field $F_{IN+1}$ both have odd parity (i.e. are composed of odd numbered pixel lines). On the other hand, if reference field $F_{IN}$ has odd parity, then preceding field $F_{IN-1}$ and following field $F_{IN+1}$ are both of even parity.

A motion map $MM_N$ is generated at block 202 by comparing the chrominance and luminance data of each pixel value of preceding field $F_{IN-1}$ against both a threshold value and the luminance and chrominance data of the corresponding pixel value of following field $F_{IN+1}$. In the illustrated embodiment, for a given one of the luminance and chrominance values of each pixel value, motion at the corresponding pixel position is detected when the absolute value of the difference between the corresponding pixel values in fields $F_{IN-1}$ and $F_{IN+1}$ is greater than the selected threshold value. The resulting motion map $MM_N$ is preferably a one (1) bit per pixel map, with the bit mapping to a given pixel position set to a logic one (1) to indicate a change in luminance, chrominance, or both luminance and chrominance of the corresponding pixel value between fields $F_{IN-1}$ and $F_{IN+1}$ (i.e. motion detected) or to a logic zero (0) to indicate no change in either luminance or chrominance of that pixel value between fields $F_{IN-1}$ and $F_{IN+1}$ (i.e. no motion detected). As discussed further below, motion maps generated at block 202 have lines of bits of either an odd or even parity, depending on the parity of the lines of the preceding and following fields being compared by parity check. In particular, if interlaced fields $F_{IN-1}$ and $F_{IN+1}$, are odd, the lines of motion $MM_N$ map represent odd pixel lines, and if interlaced fields $F_{IN}$ and $F_{IN+1}$ are even, the lines of motion map $MM_N$ represent even pixel lines.

For the generation of exemplary pixel value $P_{PXY+1}$ corresponding to display pixel position $P_{PXY+1}$, the corresponding bit in motion map $MM_N$ is checked at block 203 for motion between pixel values $P_{IXY+1}$ corresponding to display pixel position $P_{IXY+1}$ of preceding field $F_{IN-1}$ and following field $F_{IN+1}$. In other words, a check for motion is made between the pixel value for the same pixel position along the corresponding line of the temporally prior field of the same parity as the bit being generated and the pixel value for the same pixel position along the corresponding line of the next temporal field of the same parity as the bit being generated.

If motion is detected at decision block 204, then at block 205, pixel value $P_{PXY+1}$ of progressive scan frame $F_{PN}$ is generated by interpolating between pixel values of the current field, for example, between pixel values $P_{IXY}$ and $P_{IXY+2}$ corresponding to vertically aligned pixel positions $P_{IXY}$ and $P_{IXY+2}$ of reference field $F_{IN}$. In other words, in the present example, the current pixel value is generated by interpolating from the vertically adjacent pixel values of the line above and the line below the line being generated in the progressive scan frame. In alternative embodiments, other pixel values in the neighborhood of pixel value $P_{PXY+1}$ may be utilized in the interpolation operation. After interpolation at block 205, the pixel index X is incremented, and if the end of the current line has been reached, the line index Y is incremented. If the end of current frame $F_{PN}$ has not been reached at block 217, then procedure 200 loops-back to block 203 to initiate the generation of the next pixel value corresponding to the next pixel position in progressive scan frame $F_{PN}$.

On the other hand, if no motion is detected at decision block 204, then at block 206, pixel value $P_{PXY+1}$ of progressive scan frame $F_{PN}$ is generated by weaving in the corresponding pixel value $P_{IXY+1}$ of temporally preceding field $F_{IN+1}$. In other words, the current pixel value being generated is taken from the corresponding pixel value and line of the next interlaced field of the same parity as the progressive scan line being generated.

After weaving is performed at block 206, a check is made at block 207 for feathering at pixel position $P_{PXY+1}$ of progressive scan frame $F_{PN}$. Feathering is checked by comparing the characteristics of corresponding pixel value $P_{PXY+1}$ with the characteristics of the pixel values $P_{PXY}$ and $P_{PXY+2}$ corresponding to vertically adjacent pixel positions $P_{PXY}$ and $P_{PXY+2}$ of progressive scan frame $F_{PN}$. Specifically, the luminance and chrominance of pixel value $P_{PXY+1}$ are compared against the luminance and chrominance of pixel values $P_{PXY}$ and $P_{PXY+2}$ after weaving. If the luminance, chrominance, or both luminance and chrominance of weaved pixel value $P_{PXY+1}$ deviates by a threshold amount from that of both pixel values $P_{PXY}$ and $P_{PXY+2}$, a check for feathering is required because the single motion map parity check at block 203 can miss motion which occurs during the time between the generation of preceding field $F_{IN-1}$ and following field $F_{IN+1}$. On the other hand, feathering could be a representation of vertical spatial high frequency. Advantageously, one of the principles of the present invention allows for an accurate determination if any detected feathering represents actual motion or vertical spatial high frequency.

At decision block 208, feathering is detected when the magnitude of any change, in at least one of the luminance or chrominance values, between pixel value $P_{PXY+1}$ and both pixel values $P_{PXY}$ and $P_{PXY+2}$ exceeds a selected threshold, and the direction of change between pixel value $P_{PXY+1}$ and pixel value $P_{PXY}$ and the direction of change between pixel value $P_{PXY+1}$ and pixel value $P_{PXY+2}$ is the same. Otherwise, if any of these three conditions is not met, an absence of motion is detected at pixel position $P_{PXY+1}$.

If no feathering is detected, the weave performed at block 206 is accepted at block 209, and procedure 200 moves to the generation of the next pixel value corresponding to the next pixel position in progressive scan frame $F_{PN}$. In other words, the weaved pixel value $P_{PXY+1}$ is utilized in the corresponding pixel position in progressive scan frame $F_{PN}$.

In contrast, if feathering is detected at decision block 208, then historical value motion detection must be performed to determine if the feathering is the result of actual motion or the result of vertical spatial high frequency. Vertical spatial high frequency occurs when pixel values rapidly change because of sharp spatial changes in the display objects being generated, such as at the boundaries checker-board patterns or with fine resolution pixel patterns, such as fine display vertical object lines.

To detect historical motion at pixel position $P_{PXY+1}$, motion maps $MM_{N-Z-1}$ to $MM_{N-1}$, which were created at block 203 during the generation of Z number of temporally preceding progressive frames $F_{IN-Z-1}$ to $F_{IN-1}$, are combined into a single motion map (current motion map $MM_N$ is not included) in which Z is an integer, preferably less than ten (10). Specifically, a determination is made at decision block 210 as to the parity of the line of pixel position $P_{PXY+1}$ of the current pixel value $P_{PXY+1}$ being generated. If the line including pixel position $P_{PXY+1}$ has odd parity, then the odd map lines of even-line motion maps $MM_{N-Z-1}$ to $MM_{N-1}$ are generated by interpolation of the existing even motion map lines at block 211. If the line including pixel position $P_{PXY+1}$ has even parity, then the even map lines of odd-line motion maps $MM_{N-Z-1}$ to $MM_{N-1}$ are generated by interpolation of the existing odd motion map lines at block 212.

The interpolation operations performed at blocks 211 and 212 ensure that all Z number of motion maps $MM_{N-Z-1}$ to $MM_{N-1}$ have map lines of the same parity and therefore can be appropriately combined at block 213. Combination of memory maps $MM_{N-Z-1}$ to $MM_{N-1}$, is preferably accomplished by performing a logical-OR operation on a mapping-bit by mapping-bit basis. Consequently, at decision block 214, a determination can be made as to whether, over a history of the generation of Z number of previous progressive scan frames, motion has occurred at pixel position $P_{PXY+1}$.

If historical motion has not occurred at decision block 214, then at block 215, pixel value $P_{PXY+1}$ corresponding to pixel position $P_{PXY+1}$ is considered static in value (i.e. represents vertical spatial high frequency) and the weaving performed at block 206 is accepted for the generation of progressive scan frame $F_{PN}$ (i.e. weaved pixel value $P_{PXY+1}$ is utilized in progressive scan frame $F_{PN}$ at pixel position $P_{PXY+1}$). If, instead, motion is detected at decision block 214, then at block 216, pixel value $P_{PXY+1}$ for pixel position $P_{PXY+1}$ of progressive scan frame $F_{PN}$ is generated by interpolating between pixel values of current field $F_{IN}$, such as pixel values $P_{IXY}$ and $P_{IXY+1}$ corresponding to vertically aligned pixel positions $P_{IXY}$ and $P_{IXY+1}$ of reference field $F_{IN}$. A check is performed at decision block 217 to determine whether deinterlacing of progressive frame $F_{PN}$ is complete. If the deinterlacing process is not complete for progressive frame $F_{PN}$, then procedure 200 returns to block 203 to generate the next progressive scan pixel, after incrementation of pixel index X and/or line index Y.

Otherwise, if at decision block 217, a determination is made that progressive frame $F_{PN}$ has been completely deinterlaced, then progressive frame $F_{PN}$ is ready for the detection and removal of any noise that may have been in the display pixels of reference field $F_{IN}$. For purposes of discussion, the pixels of progressive frame $F_{PN}$ after deinterlacing are designated at block 218 as follows. The original reference display pixels for a given line Y and a given parity are denoted by $P_{PXY}$ in which Y is an integer in the set Y=0, 2, 4, 6 .... The display pixels generated for progressive scan $F_{PN}$ by motion adaptive deinterlacing, as discussed above, for a line Y−1 of the opposite parity to the reference frame lines are designated $P_{PXY-1}$. Similarly, the generated pixels on following line Y+1 of the opposite parity to the lines of the reference field are denoted as $P_{PXY-1}$.

During the generation of progressive frame $F_{PN}$, any noise reduced in areas of motion in generated lines Y−1 and Y+1 is inherently reduced during the interpolation operations discussed above in conjunction with blocks 205 and 216. However, for the current frame $F_{PN}$, any noise in a given reference line Y remains. Advantageously, the principles of the present invention reduce any noise in reference lines Y.

Figure 4:
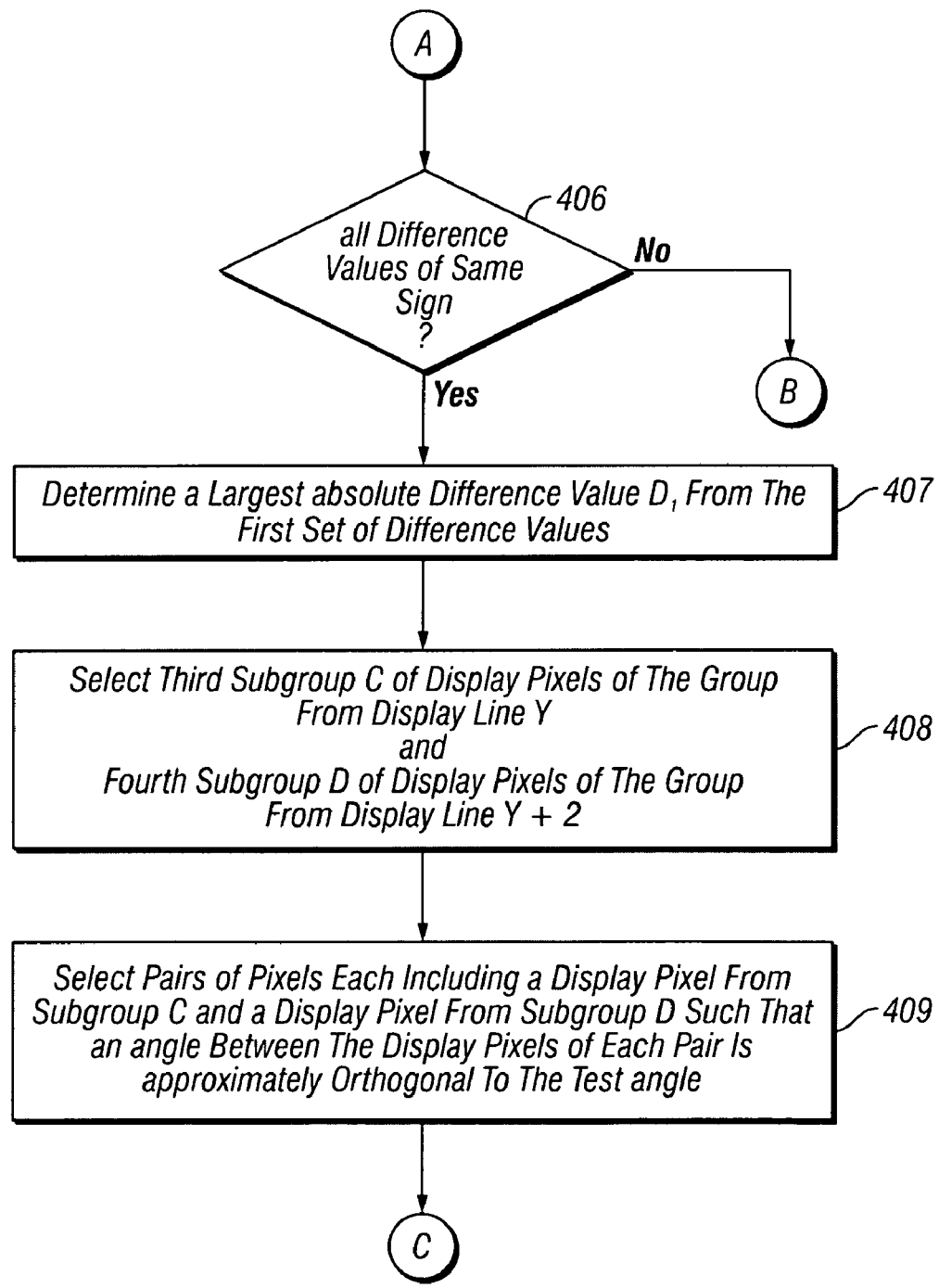
FIG. 4 is a flow chart illustrating a representative display object edge detection and video pixel data interpolation procedure embodying the principles of the present invention.
Figure 4:
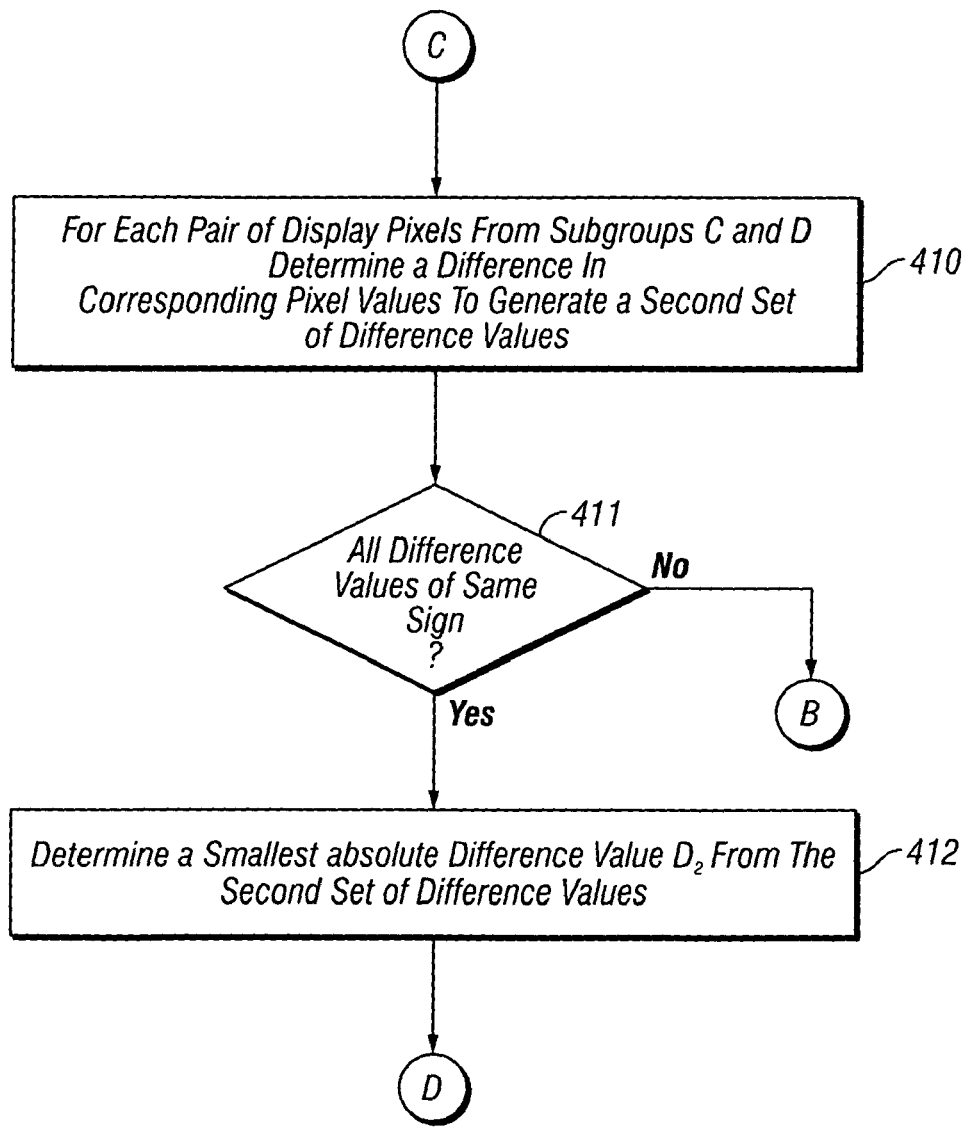
Figure 4:
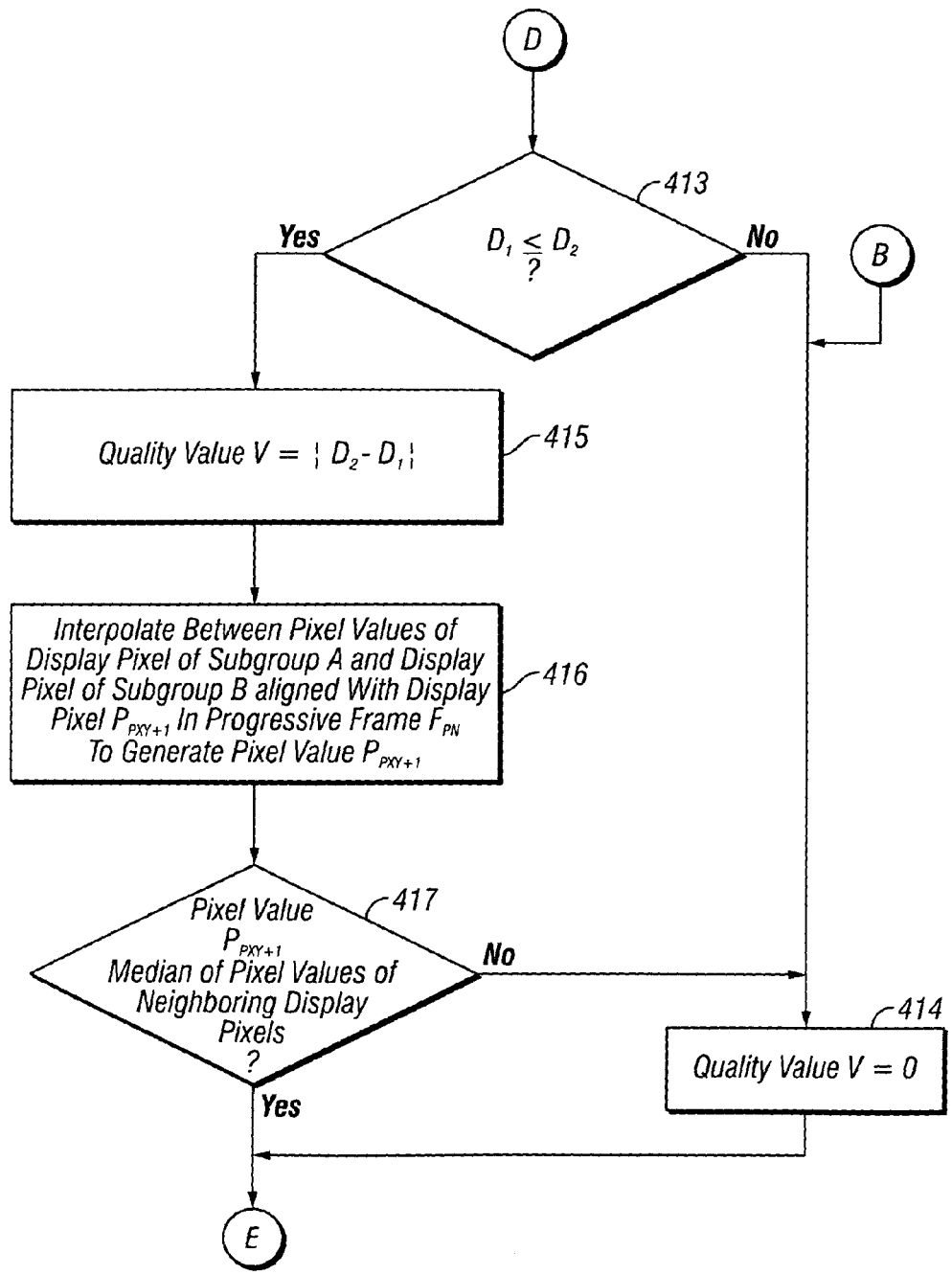
Figure 4:
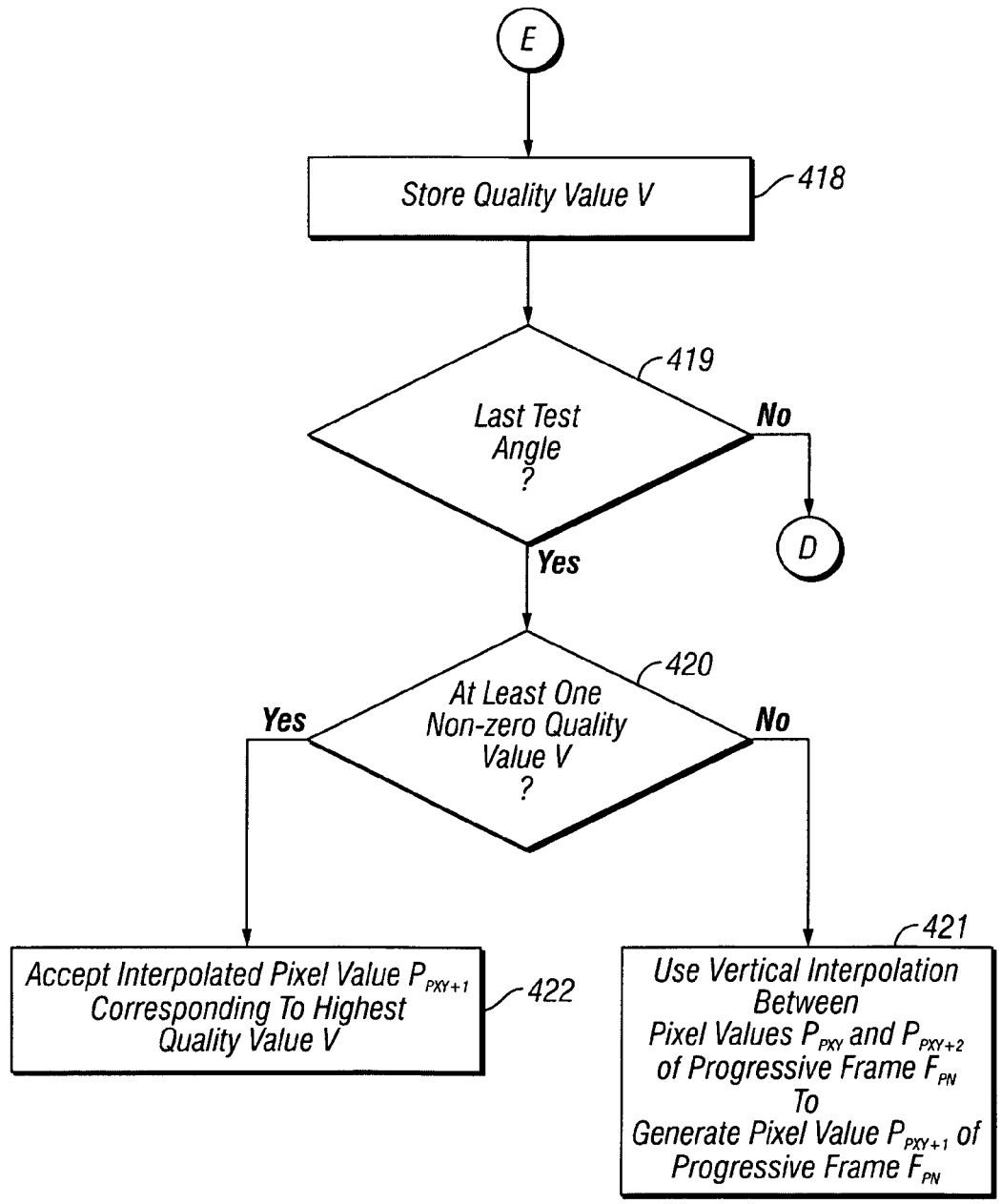

At block 219, a frame motion map $MM_F$ is generated by merging current motion map $MM_N$ with the previous motion map $MM_{N-1}$ created during the generation of the last progressive frame. Specifically, the current motion map $MM_N$ is the motion map which was generated for the current iteration of procedure 200 at block 202 and represents motion or lack of motion at each display pixel in the generated lines of progressive frame $F_{PN}$. Motion map $MM_{N-1}$ is the motion map generated at block 202 during the last iteration of procedure 200 for the generation of progressive frame $F_{PN-1}$, and represents motion or an absence of motion between the pixels of the current reference pixel lines and lines from the last field of the same parity, which in this example is field $F_{IN-2}$. In blocks 220-225, each reference pixel $P_{PXY}$ for all lines Y of reference pixel are tested for noise utilizing the field motion map $MM_F$ generated at block 219. Specifically, for each reference pixel $P_{PXY}$ being tested, the associated bit in frame motion map $MM_F$ is compared with the frame motion map $MM_F$ bits associated with a selected set of neighboring display pixels. In the embodiment illustrated in FIG. 4, the frame motion map bit of reference pixel $P_{PXY}$ being tested, is compared with the motion map bits representing eight neighboring display pixels. In particular, three pixels from neighboring generated line Y−1 (i.e. $P_{PX-1Y-1}$, $P_{XY-1}$, and $P_{PX+Y+1}$), two adjacent pixels on line Y (i.e. display pixel $P_{PX-1Y}$ and $P_{PX+1Y}$), and three pixels from neighboring generated line Y+1 (i.e. display pixel $P_{PX-1Y+1}$, $P_{PXY+1}$, and $P_{PX+1Y+1}$) form the neighborhood. In the illustrated embodiment of FIG. 4, when all eight neighboring pixels in the frame motion map $MM_F$ are set to a logic 0, thereby indicating absence of motion at the associated display pixel, and reference display pixel $P_{PXY}$ is set to a logic 1, thereby indicating motion at display pixel $P_{PXY}$, then noise is detected at reference pixel $P_{PXY}$. The neighborhood or "window" shown in FIG. 4 is exemplary only; in alternate embodiments, more or fewer neighboring pixels may be used to test for noise and/or the number of neighboring display pixels with an indicated absence of motion may change.

If at decision block 221 no noise is detected, then at block 222 the current pixel value $P_{PXY}$ of reference display pixel $P_{PXY}$ remains unchanged and procedure jumps to block 224 for a determination as to whether the end of the current frame has been reached. Otherwise, at block 223, the current reference pixel value $P_{PXY}$ is replaced with a value interpolated from pixel values from a set of neighboring display pixels $P_{PXY-1}$ and $P_{PXY+1}$ on generated lines Y−1 and Y+1 of progressive frame $F_{PN}$. Advantageously, vertical spatial high frequency edges are preserved if the set of neighboring pixels are utilized to perform a directional interpolation.

If the end of current progressive frame $F_{PN}$ has not been reached at decision block 224, then at block 225, the pixel index X and/or the line index Y is incremented and procedure 200 loops back to block 220 to test for noise at the next reference pixel. Otherwise, the processing of progressive frame $F_{PN}$ is complete, the index N and increments, the pixel index Y and the line index Y are reset to their initial values, and procedure 200 loops back to step 203, and generation of the next progressive frame by motion adaptive deinterlacing begins.

FIG. 400 is a flow chart illustrating display object edge detection and directional interpolation procedure 400 embodying the principles of the present invention. Directional interpolation procedure 400 is particularly suitable for the pixel data interpolation operations performed in blocks 205 and 216 of interlacing procedure 200 discussed above, although the present inventive principles are not limited thereto.

Figure 5A:
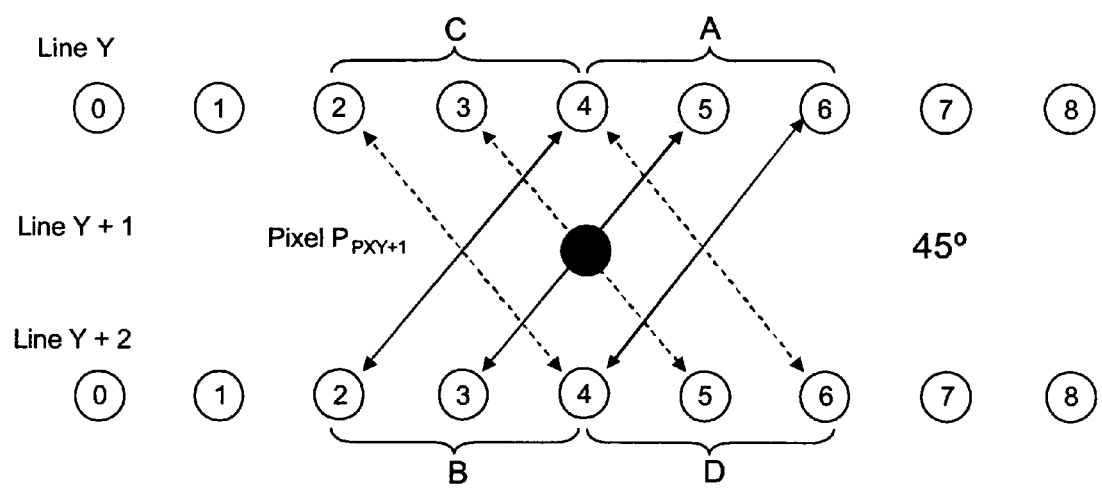
FIGS. 5A-5H are conceptual diagrams each showing a selected number of display pixels and exemplary relationships between pairs of display pixels suitable for testing for possible display object edges having various angles on a display screen.
Figure 5B:
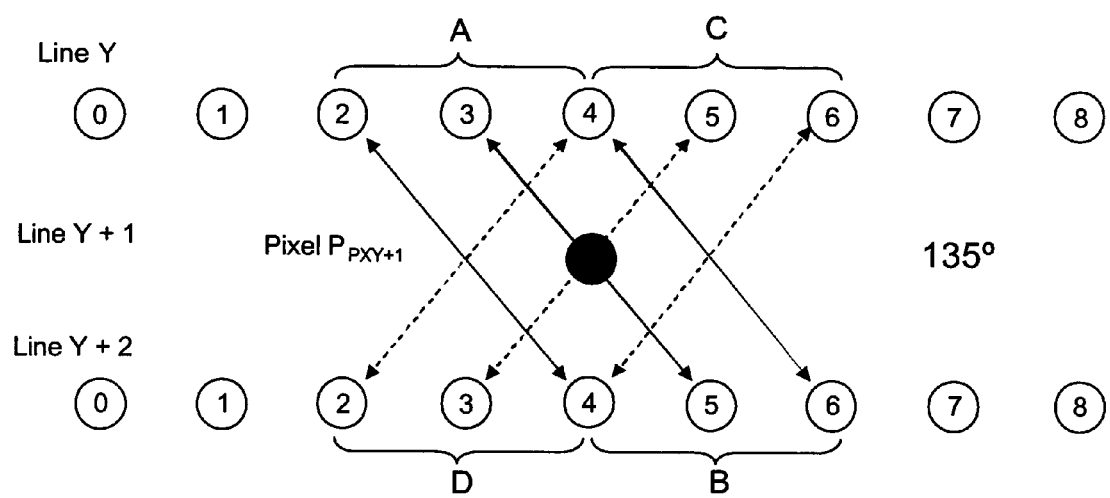
Figure 5C:
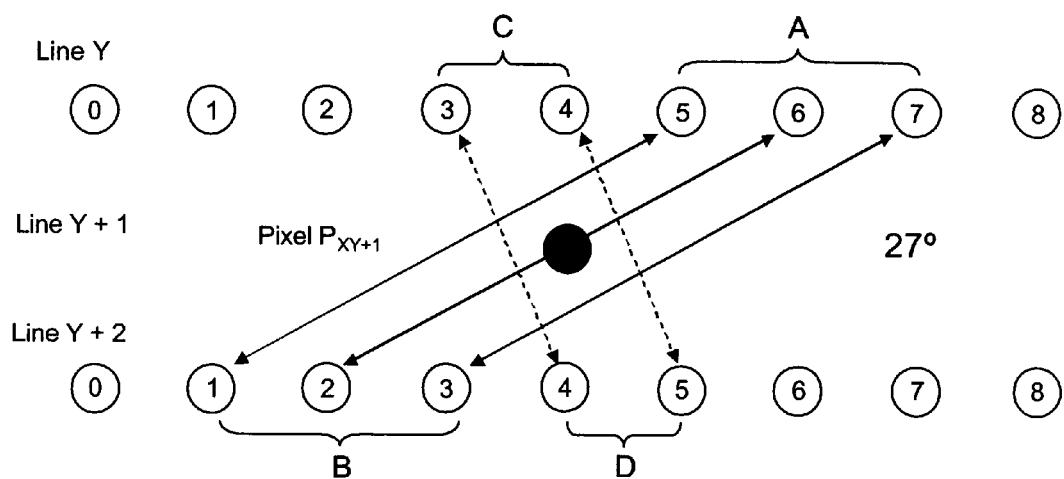
Figure 5D:
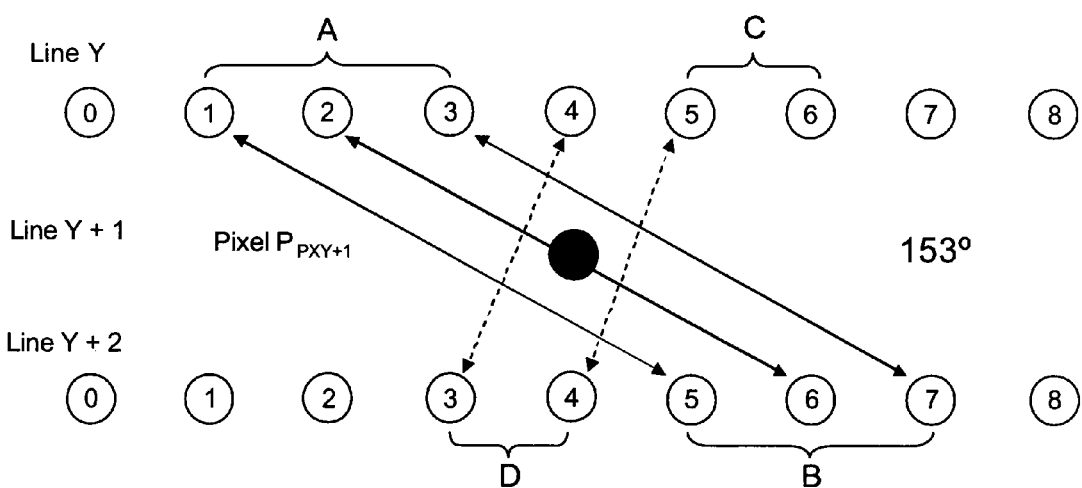
Figure 5E:
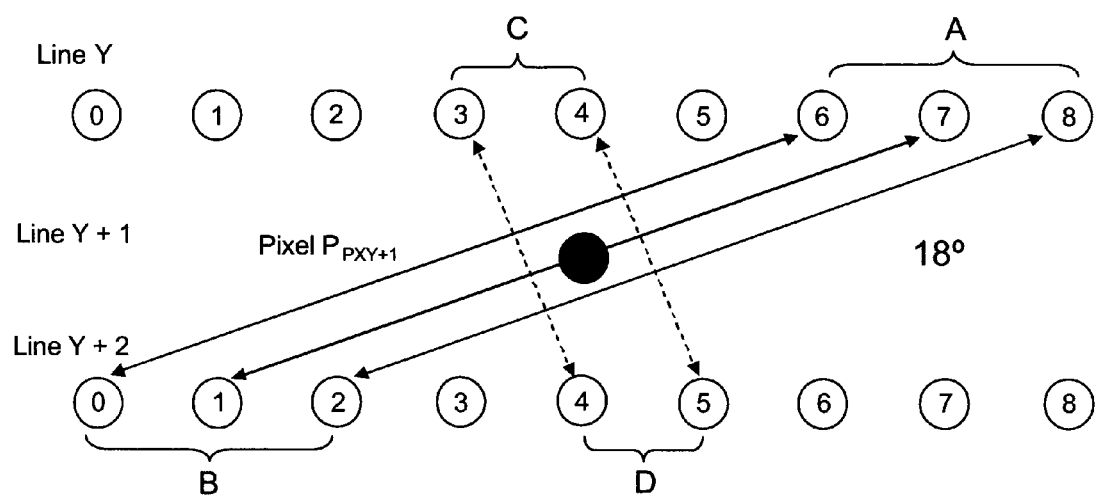
Figure 5F:
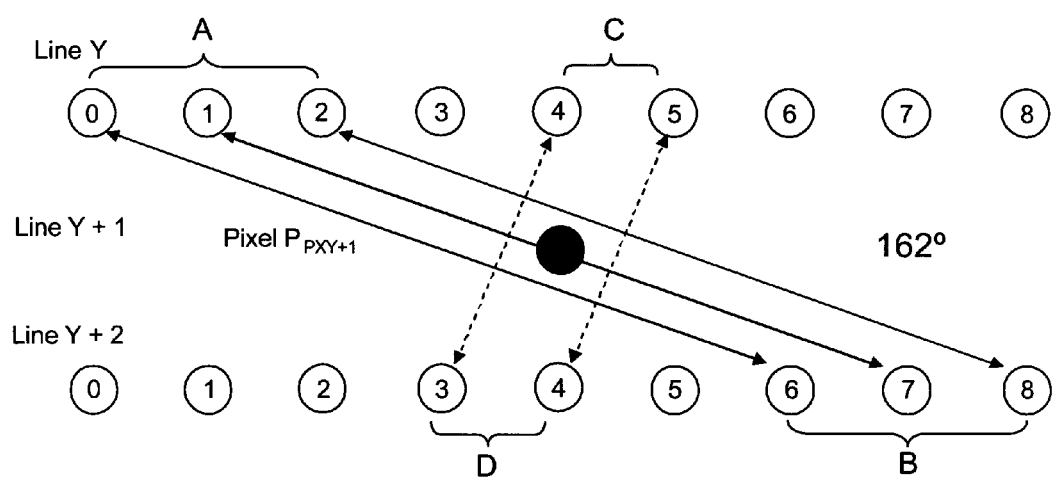
Figure 5G:
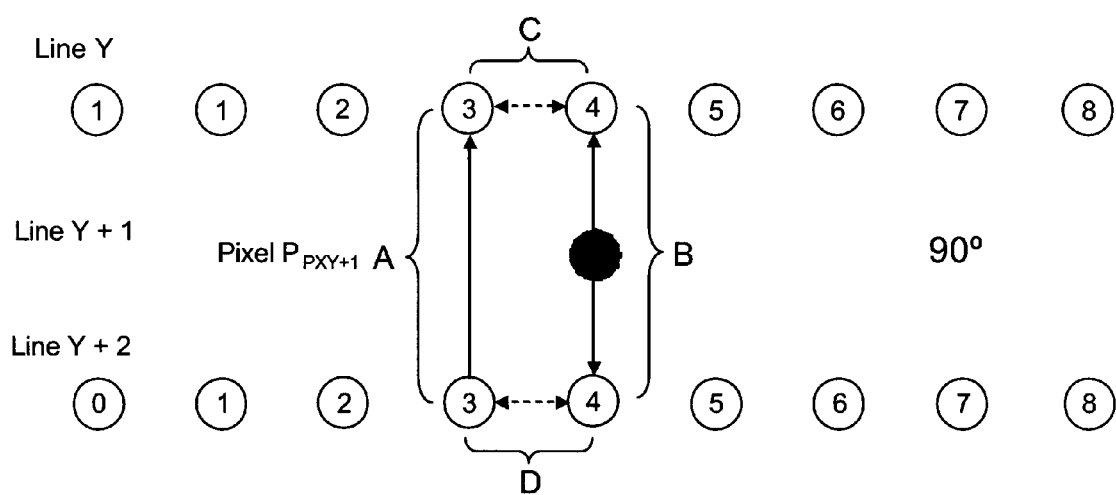
Figure 5H:
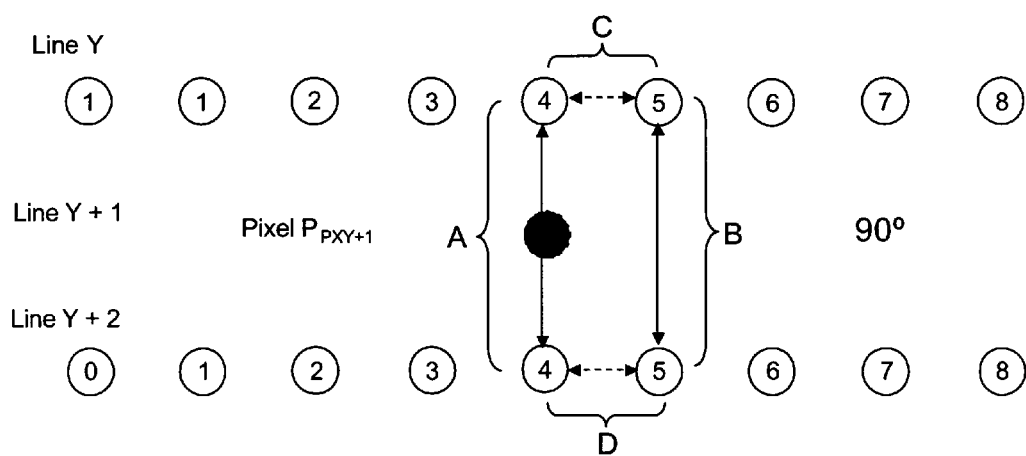

Generally, according to the principles of the present invention, a series of tests are performed to determine whether a display object edge passes through, or nearly through, a display pixel whose associated pixel value is being generated by interpolation. In particular, for a selected group of display pixels, a set of tests are performed for a set of predetermined angles between display pixels in the group, with each predetermined angle approximating a possible angle of display object edge. The purpose of the set tests is to determine whether a given set of display pixels represent an angle having a minimum variation along the display object edge angle and a maximum variation perpendicular or nearly perpendicular to the display object edge angle. From the set of display pixels that best meet these constraints, the associated pixel values of selected display pixels in the set are utilized for the interpolation operation. This procedure is conceptually illustrated in FIGS. 5A-5H for representative test angles of 45, 135, 153, 27, 18, 162, and 90 degrees; in alternate embodiments, a different set of test angles may be used. As shown in FIGS. 5G and 5H, two tests are performed to test for a vertical display object edge, since the corresponding perpendicular direction is the horizontal.

In the examples shown in FIGS. 5A-5H, a group of eighteen (18) pixels, nine (9) pixels from line Y of the progressive scan frame and nine (9) pixels from line Y+2 of the progressive scan frame, are selected in the neighborhood of display pixel $P_{PXY+1}$ whose pixel value is being generated by interpolation. In alternate embodiments, the number of neighboring display pixels selected for edge detecting may vary. For each angle being tested, four subgroups A-D are selected from the group of neighboring pixels. Subgroup A from line Y and subgroup B from line Y+2 are selected to test for a minimum in variation in pixel values along the angle being tested. Each pixel in subgroup A corresponds to a pixel in subgroup B, with each pair of corresponding pixels disposed relative to each other at the angle being tested. For example, in the 45 degree example shown in FIG. 5A, display pixels 4, 5 and 6 of subgroup A are disposed at an angle of 45 degrees from vertical with respect to pixels 2, 3 and 4 of subgroup B, as shown by the solid lines. Two additional subgroups, subgroups C and D are selected for testing for the maximum variation in pixel values perpendicular or nearly perpendicular to the angle being tested. For the 45 degree test shown in FIG. 5A, display pixels 2, 3 and 4 of subgroup C are disposed at an angle of 135 degrees from vertical with respect to display pixels 4, 5 and 6 of subgroup D.

Mathematically, to determine whether a selected pair of subgroups A and B of display pixels being tested show a minimum variation along the angle being tested and the maximum variation perpendicular or nearly perpendicular to the angle being tested, two constraints must be satisfied. First, the absolute maximum difference in pixel values between corresponding display pixels in subgroups A and B must be less than or equal to the absolute minimum difference in pixel values between corresponding pixels in subgroups C and D. Second, the differences in pixel values between all corresponding pairs of display pixels in subgroups A and B must all be of the same sign and the differences in pixel values between all corresponding pairs of pixels in subgroups C and D must all have the same sign. (The difference values taken between corresponding pixels in subgroups A and B may differ in sign from the difference in pixel values taken for the display pixels of subgroups C and D.) In other words, for a given pair of subgroups A and B or C and D, the direction of variation in pixel values between pairs of corresponding display pixels within the subgroup must consistently be in the same direction.

Once all the mathematical constraints are satisfied, for a given test angle, a quality value V is generated, where V is the difference in value between the minimum absolute difference in pixel values between any pair of pixels in subgroups C and D and the maximum absolute difference in pixel values between any pair of pixels in subgroups A and B. If neither of the constraints is met, then the quality value is set to O. In the preferred embodiment, this test is performed for each prospective angle, with the quality value V forced to zero (0) for those angles that do not meet the constraints discussed above. The corresponding group of pixels with the highest quality value V is selected for performing the interpolation operation.

In the preferred embodiment, once a group of pixels with the highest quality value V is selected, the pixel values for the display pixels of groups A and B which align with the pixel being generated are utilized for the interpolation. For example, in the 45 degree example of FIG. 5A, the pixel value corresponding to display pixel 5 of subgroup A and the pixel value corresponding to display pixel 3 of subgroup B are utilized for the interpolation.

After the interpolation is performed, a test is made to determine whether the interpolated pixel value for the displaying pixel being generated approximates the median pixel value for a neighboring set of pixels in the selected group. In the preferred embodiment of the present inventive principles, a test is performed to determine whether the pixel values of the three closest neighboring pixels in line Y are either all greater than or equal in pixel value or all less than or equal to the pixel value which was generated by interpolation. Additionally, a determination is made as to whether the pixel value for the three closest neighboring pixels in line Y+2 are all greater than or equal to or all less than and equal to the pixel value which was generated by interpolation. Finally, if the three closest neighboring display pixels in line Y have pixel values which are all greater than or equal to the pixel value corresponding to the generated pixel, then the three closest neighboring pixels of line Y+2 must have pixel values which are all less than or equal to the generated pixel. On the other hand, if the three closest neighboring pixels in line Y have pixel values which are all less than or equal to the generated pixel, then the three closest neighboring pixels in line Y+2 must have pixel values which are all greater than or equal to the generated pixel. If any of these constraints is not satisfied, then the interpolation operation is not accepted and a default interpolation operation, discussed below, is performed. For example, for the 45 degree case of FIG. 5A, if the pixel values for display pixels 3, 4 and 5 of line Y are all greater than or equal to the pixel value generated by interpolation for pixel $P_{PXY+1}$, then the pixel values associated with pixels 3, 4 and 5 of line Y+2 must all be less than or less than or equal to the value of pixel $P_{PXY+1}$ generated through interpolation, and vice versa.

If, after testing all possible sets of predetermined angles, no set of display pixels is found to have a non-zero quality value V, then a default interpolation utilizing the vertically adjacent display pixels is performed to generate the pixel of interest. Additionally, as mentioned above, if the pixel value generated by interpolation does not approximate the median pixel value of a group of closest neighboring display pixels, then a default interpolation operation utilizing the vertically adjacent display pixels is performed to generate the required pixel value. For the example of pixel $P_{PXY+1}$ shown in FIGS. 5A and 5B, a vertical interpolation is performed between pixel 4 of line Y and pixel 4 of line Y+2 as the default interpolation operation in the illustrated embodiment.

The particular exemplary directional interpolation procedure 400 shown in FIG. 4 begins at step 401. A group of display pixels from display lines Y and Y+2 of interlaced reference field $F_{IN}$ in the neighborhood of pixel display $P_{PXY+1}$ being generated for progressive frame $F_{PN}$ line Y+1 is selected. At block 403, a first subgroup A of display pixels of the group is selected from display line Y and a second subgroup B of display pixels of the group are selected from display line Y+2. Next, at block 404, pairs of pixels are selected each including a display pixel from subgroup A and a display pixel from subgroup B such that an angle between the display pixels of each pair approximates a test angle for testing for a possible edge of a display object passing through display pixel $P_{PXY+1}$.

For each pair of display pixels in subgroup A and subgroup B, a difference in corresponding pixel values is calculated by subtracting the given pixel value of subgroup B from the corresponding pixel value of subgroup B, to generate a first set of difference values at block 405. If, at block 405, all the difference values calculated at block 405 are of the same mathematical sign, then the test of the current angle continues. Otherwise, procedure 400 jumps to block 414, and a quality value V of zero (0) is assigned to the current angle. Then, at block 406, the largest absolute difference value D1 is selected from the set of difference values calculated at block 407.

At block 408, a third subgroup C of display pixels of the group is selected from display line Y and a fourth subgroup D of display pixels of the group is selected from display line Y+2. From the third and fourth subgroups, pairs of pixels are selected at block 409, with each pair including a display pixel from subgroup C and a display pixel from subgroup D such that an angle between the display pixels of each pair is approximately orthogonal to the test angle. For each pair of display pixels of subgroups C and D, a difference in corresponding pixel value is determined at block 410 by subtracting the given pixel value of subgroup D from the corresponding pixel value of subgroup C, to generate a second set of difference values. When the difference values generated at block 410 are of the same mathematical sign at block 411, then a smallest absolute difference value D2 is determined from the second set of difference values at block 412; otherwise procedure 400 jumps to block 413 and a quality value V of zero is assigned to the current angle being tested.

At decision block 413, a test is made to determine whether the largest absolute difference value D1 calculated for subgroups A and B is less than or equal to the smallest absolute difference value D2 calculated for subgroups D and C. If difference value D1 is not less than or equal to difference value D2, then a quality value V of zero is assigned to the current angle being tested at block 414. Otherwise, at block 415, the quality value V is calculated as the absolute difference between difference value D2 and difference value D1.

At block 416, interpolation is performed between the pixel values corresponding to the display pixel of subgroup A and the display pixel of subgroup B which are aligned with display pixel $P_{PXY+1}$ in progressive frame $F_{PN}$. At decision block 417, a test is performed to determine whether the pixel value $P_{PXY+1}$ generated by interpolation approximates the median of pixel values of a group of closest neighboring display pixels. As discussed above, the test at block 417 in the illustrated embodiment is performed by first determining whether the pixel values corresponding to the three closest display pixels to display pixel $P_{PXY+1}$ on line Y are all greater than or equal to the interpolated pixel value $P_{PXY+1}$ and the pixel values corresponding to the three closest display pixels to the display pixel $P_{PXY+1}$ on line Y+2 are all less than or equal to the interpolated pixel value $P_{PXY+1}$, or the pixel values corresponding to the three closest display pixels to display pixel $P_{PXY+1}$ on line Y are all less than or equal to the interpolated pixel value $P_{PXY+1}$ and the pixel values corresponding to the three closest display pixels to the display pixel $P_{PXY+1}$ on line Y+2 are all greater than or equal to the interpolated pixel value $P_{PXY+1}$.

If the pixel value $P_{PXY+1}$ generated by interpolation does not approximate the median of pixel values of a group of closest neighboring display pixels at block 417, then procedure 400 returns to block 414 and the quality value V is set to zero (0). Otherwise, at block 418 the quality value determined at either block 414 or block 415 is stored.

If, at decision block 419, the last of the predetermined set of test angles has not yet been tested, then procedure 400 loops back to block 402 for testing at the next test angle. Otherwise, at decision block 420, a determination is made as to whether at least one non-zero quality value V has been calculated for any of the predetermined set of test angles.

If no non-zero quality values V have been calculated and stored, then at block 421, vertical interpolation is used as a default condition. In the illustrated embodiment, vertical interpolation is performed between the pixel values $P_{PXY}$ and $P_{PXY+2}$ corresponding to progressive frame display pixel $P_{PXY}$ of line Y and $P_{PXY+2}$ of line Y+2, which are interpolated to generate a pixel value $P_{PXY+1}$ corresponding to progressive frame display pixel $P_{PXY+1}$. Otherwise, if at decision block 420, at least one non-zero quality value V has been calculated, then at block 422 the interpolated pixel value $P_{PXY+1}$ corresponding to the highest quality value V is utilized to generate display pixel $P_{PXY+1}$.

In alternate embodiments of procedure 400, a second technique may be implemented at block 420, when all quality values V are zero (0). Specifically, if the previous pixel value was calculated using a test angle associated with a non-zero quality value V, then that previous test value may be used for the current iteration of procedure 400, subject to a reduced set of constraints. In particular, only the constraints applied to subgroups A and B above for the possible edge angle are utilized. The constraints on subgroups C and D discussed above are not applied. The constraint that the pixel value being generated approximates the median pixel value of the closest neighboring display pixels may also be utilized. If these remaining constraints are met, then the test angle utilized to generate the previous pixel value may be used for interpolation of the current pixel value.

Advantageously, embodiments of the present principles discriminate between noise and actual motion on the display screen, such that only the noise is removed without adversely affecting the appearance of moving display objects. Furthermore, the embodiments of the present principles also discriminate between noise and display objects with spatial high frequency, such that spatial high frequency is not compromised during noise filtering.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A method of deinterlacing comprising:
generating, by motion adaptive deinterlacing, a deinterlaced display frame including a reference field of lines of display pixels of a first parity and a generated field of lines of display pixels of a second parity, comprising:
interpolating between pixels of the reference field to generate pixels in the generated field in areas of the deinterlaced frame having motion; and
weaving pixels from a following field of lines of the second parity to generate pixels in the generated field in areas of the deinterlaced frame without motion;
generating a frame motion map including bits representing a presence of motion or an absence of motion at corresponding display pixels of the reference and generated fields;
testing for noise at a selected display pixel of the reference field utilizing the frame motion map; and
in response to detecting noise at the selected display pixel of the reference field, replacing a pixel value corresponding to the selected display pixel with a pixel value generated by interpolating between display pixel values corresponding to neighboring display pixels in the generated field.

2. The method of claim 1, wherein testing for noise comprises:
comparing a value of a bit of the frame motion map corresponding to the selected, display pixel of the reference field with values of bits of the frame motion map corresponding to neighboring display pixels; and
in response to comparing, detecting noise in response to a pattern between the value corresponding to the selected display pixel of the reference field and the values corresponding to the neighboring display pixels.

3. The method of claim 2, wherein detecting noise comprises detecting noise when the value of the frame motion map corresponding to the selected pixel differs from the value of the frame motion map corresponding to each of the neighboring pixels.

4. The method of claim 2, wherein the values of the frame motion map corresponding to the neighboring display pixels comprise values corresponding to display pixels of the generated field.

5. The method of claim 2, wherein the values of the frame motion map corresponding to the neighboring display pixels comprise values corresponding to display pixels of the reference field.

6. The method of claim 2, wherein the values of the frame motion map corresponding to neighboring display pixels correspond to neighboring display pixels forming a rectangular window having a center at the selected display pixel of the reference field.

7. The method of claim 1, wherein replacing a pixel value corresponding to the selected display pixel with a pixel value generated by interpolating between display pixel values corresponding to neighboring display pixels in the generated field comprises performing directional interpolation.

8. A video data processing system operable to:
generate a deinterlaced display frame including a reference field of lines of display pixels of a first parity and a generated field of lines of display pixels of a second parity by:
  interpolating between pixels of the reference field to generate pixels in the generated field in areas of the deinterlaced frame having motion; and
  weaving pixels from a following field of lines of the second parity to generate pixels in the generated field in areas of the deinterlaced frame without motion;
generate a frame motion map including bits representing a presence of motion or an absence of motion at corresponding display pixels of the reference and generated fields;
test for the presence of noise at a selected display pixel of the reference field utilizing the frame motion map; and
in response to detecting noise at the selected display pixel of the reference field, replace a pixel value corresponding to the selected display pixel with a pixel value generated by interpolating between display pixel values corresponding to neighboring display pixels in the generated field.

9. The video data processing system of claim 8, wherein the video processing system is operable to test for noise by testing for a pattern between bit values of the frame motion map representing motion at the selected pixel of the reference field and bit values representing an absence of motion at a selected number of neighboring display pixels.

10. The video data processing system of claim 9, wherein the video processing system is operable to test for a pattern by observing bit values of the frame motion map corresponding to display pixels in a rectangular window surrounding the selected pixel of the reference field.

11. The video data processing system of claim 8, wherein the video processing system is operable to test for noise by comparing a bit value of the frame motion map corresponding to the selected pixel of the reference field and bit values of the frame motion map corresponding to neighboring pixels in a generated line.

12. The video data processing system of claim 11, wherein the video processor is further operable to compare the bit value of the frame motion map corresponding to the selected pixel of the reference field and bit values of the frame motion map corresponding to neighboring pixels in the reference field.

13. The video data processing system of claim 10, wherein the video processing system is operable to testing for a pattern including bit values representing an absence of motion at a majority of the neighboring display pixels.

14. The video data processing system of claim 8, wherein the video data processing system is further operable to interpolate between display pixel values corresponding to neighboring display pixels in the generated field utilizing directional interpolation.

15. A method of filtering noise from a display frame including a reference field of lines of display pixels of a first parity and a generated field of lines of display pixels of a second parity, the display frame having been generated by adaptive motion adaptive deinterlacing including selective interpolation and weaving of pixels to generate the generated frame as a function of motion, comprising:
  testing for noise at display pixels of the reference field after generation of the display frame, comprising:
    generating a frame motion map including bits representing a presence of motion or an absence of motion at corresponding display pixels of the reference and generated fields; and
    testing for patterns in values corresponding to the bits of the frame motion map to detect noise at pixels within the reference field; and
  in response to detecting noise at a selected display pixel of the reference field, replacing a pixel value corresponding to the selected display pixel with a pixel value generated by interpolating between display pixel values corresponding to neighboring display pixels in the generated field.

16. The method of claim 15, wherein testing for patterns comprises:
  comparing a value of a bit of the frame motion map corresponding to a selected display pixel of the reference field with values of bits of the frame motion map corresponding to neighboring display pixels; and
  in response to comparing, detecting noise in response to a selected pattern including the value corresponding to the selected display pixel of the reference field and the values corresponding to the neighboring display pixels.

17. The method of claim 15, wherein the selected pattern corresponds to a rectangular pattern of display pixels including the selected display pixel of the reference field and the neighboring display pixels.

18. The method of claim 15, wherein generating a frame motion map comprises combining field motion maps representing historical motion or historical absence of motion for the generated and reference fields over a selected number of corresponding generated and reference fields.

\* \* \* \* \*